(12) United States Patent
Geary et al.

(10) Patent No.: US 8,628,132 B2
(45) Date of Patent: Jan. 14, 2014

(54) SOLENOID GRIPPER

(75) Inventors: James W. Geary, Pawcatuck, CT (US); Peter E. McCormick, Dallas, TX (US)

(73) Assignee: Delaware Captial Formation, Inc., Wilmington, DE (US)

(*) Notice: Subject to any disclaimer, the term of this patent is extended or adjusted under 35 U.S.C. 154(b) by 0 days.

(21) Appl. No.: 13/426,711

(22) Filed: Mar. 22, 2012

(65) Prior Publication Data

US 2012/0175902 A1 Jul. 12, 2012

Related U.S. Application Data

(62) Division of application No. 12/348,045, filed on Jan. 2, 2009, now Pat. No. 8,186,733.

(51) Int. Cl.
*B25J 15/08* (2006.01)

(52) U.S. Cl.
USPC .................. 294/207; 294/119.1; 294/192

(58) Field of Classification Search
USPC ............... 294/192, 195, 202, 203, 207, 115, 294/119.1; 269/216; 901/36
See application file for complete search history.

(56) References Cited

U.S. PATENT DOCUMENTS

| | | | |
|---|---|---|---|
| 3,012,811 A | 12/1961 | Sandrock | |
| 3,471,194 A | 10/1969 | Martin et al. | |
| 4,179,150 A | 12/1979 | Conrad et al. | |
| 4,367,998 A | 1/1983 | Causer | |
| 4,629,237 A | 12/1986 | Ito | |
| 4,634,107 A | 1/1987 | Vandersyde et al. | |
| 4,667,998 A | 5/1987 | Borcea et al. | |
| 4,684,128 A | 8/1987 | Verstraeten | |
| 4,697,246 A | 9/1987 | Zemke et al. | |
| 4,872,803 A | 10/1989 | Asakawa | |
| 4,874,194 A | 10/1989 | Borcea et al. | |
| 4,878,705 A | 11/1989 | Arnquist | |
| 5,040,836 A | 8/1991 | Roudaut | |
| 5,226,779 A | 7/1993 | Yeakley | |
| 5,280,981 A | 1/1994 | Schulz | |
| 5,669,652 A | 9/1997 | Reising et al. | |
| 5,775,755 A | 7/1998 | Covert et al. | |
| 6,161,888 A | 12/2000 | Black et al. | |
| 6,398,281 B1 | 6/2002 | Heimberg | |
| 6,428,070 B1 | 8/2002 | Takanashi et al. | |
| 6,435,494 B2 | 8/2002 | Takahashi et al. | |
| 6,505,871 B2 | 1/2003 | McCormick | |
| 6,626,476 B1 | 9/2003 | Govzman et al. | |
| 2001/0028175 A1 | 10/2001 | Thompson et al. | |
| 2010/0171332 A1 | 7/2010 | Geary et al. | |

FOREIGN PATENT DOCUMENTS

| | | |
|---|---|---|
| CN | 101172343 | 5/2008 |
| CN | 101316686 | 12/2008 |
| JP | 62-116513 | 7/1987 |
| JP | 04-189491 | 7/1992 |

*Primary Examiner* — Dean Kramer
(74) *Attorney, Agent, or Firm* — Harness, Dickey & Pierce, P.L.C.

(57) ABSTRACT

An electrical gripper has a housing and a solenoid plunger. A pair of jaws are movably mounted with the housing. The jaws are movable towards and away from each other. The jaws are coupled with the solenoid plunger to provide movement to the jaws. A first mechanism is associated with the solenoid plunger to lock the solenoid plunger in a first position when power is terminated to the solenoid plunger. A second mechanism is associated with the solenoid plunger to lock the solenoid plunger in a second position when power is terminated to the solenoid plunger. Thus, the jaws are actively locked in an open or close position when power is terminated to the solenoid plunger.

11 Claims, 7 Drawing Sheets

SOLENOID GRIPPER

CROSS-REFERENCE TO RELATED APPLICATIONS

This application is a divisional of U.S. patent application Ser. No. 12/348,045 filed on Jan. 2, 2009. The entire disclosure of the above application is incorporated herein by reference.

FIELD

The present disclosure relates to a gripper apparatus and, more particularly, to an electric gripper with a solenoid activating mechanism.

BACKGROUND

Pneumatic actuated grippers exist in the field. However, users of pneumatic actuated grippers seek electric alternatives to the pneumatic for various reasons. Reasons for seeking alternative actuators are lower energy costs and application where pneumatics are undesirable or unavailable. One such environment is a controlled clean room.

Electric grippers exist in the field. However, these electric grippers are expensive and difficult to operate when compared with their pneumatic counterparts. These add to the cost and complexity of the grippers. Most electric grippers require feedback devices and complicated control systems.

Solenoid driven grippers have been utilized in the past. However, these grippers are problematic in that they create a large heat build up. This is due to the fact that power is continuously on in these solenoid grippers. That is, the solenoid magnetic coil always requires power to maintain its state of full open or full close. Thus, these solenoid grippers generate a tremendous amount of heat. Thus, it is desirable to provide an electric gripper that is as simple to control as a pneumatic gripper and also has a comparable cost to the pneumatic gripper.

The present disclosure provides the art with an electric gripper that overcomes the deficiencies of prior art electric grippers. The present gripper provides the field with an electric gripper that is locked in a first, full open, and second, full close, position. The present disclosure provides an electric gripper that is activated for a very short duration in both a latching and unlatching direction. The present electric gripper is of a simple construction and utilizes simple control logic. The present disclosure provides an electric gripper that is held in both its full open and full close positions when power is terminated to the solenoid. Thus, no energy is required to hold the gripper in both a first, full open, and second, full close, position.

SUMMARY

In accordance with a first aspect of the disclosure, a gripper comprises a housing with an associated solenoid plunger that defines an axis. A pair of opposed jaws are movably mounted with the housing. The jaws are movable towards and away from each other. The jaws are coupled with the solenoid plunger to provide movement to the jaws. A biasing mechanism is associated with the solenoid plunger to lock the solenoid plunger in a first position when power is terminated to the solenoid plunger. A permanent magnet is associated with the solenoid plunger to lock the solenoid plunger in a second position when power is terminated to the solenoid plunger. The jaws are actively locked in an open or close position when power is terminated to the solenoid plunger. The biasing mechanism is a spring that, in its extended position, holds the jaws in a closed or open position. The permanent magnet holds the jaws in an open or closed position. A wedge is coupled with the solenoid plunger and the jaws to facilitate the to and fro movement. Additionally, a linkage can be coupled with the solenoid plunger to facilitate the to and fro movement to the jaws. The solenoid plunger is powered by a pulse of about 10% to 20% of its duty cycle. The pulse is an alternating positive and a negative pulse to latch and unlatch the solenoid that, in turn, opens and closes the jaws. The permanent magnet is positioned along the axis at the bottom of the plunger stroke.

According to a second aspect of the disclosure, the gripper comprises a housing, a solenoid plunger, and a (first and second) pair of opposing jaws. The jaws are movably mounted with the housing and move towards and away from each other. The jaws are coupled with the solenoid plunger to provide movement to the jaws. A first mechanism is associated with the solenoid plunger to lock the solenoid plunger in a open position, when power is terminated to the solenoid plunger. A second mechanism is associated with the solenoid plunger to lock the solenoid plunger in a closed position, when power is terminated to the solenoid plunger. The first mechanism is a permanent magnet. The magnet holds the jaws in an open or closed position. The second mechanism is a spring. The spring, in its extended position holds the jaws in a closed or open position. A wedge is coupled with the solenoid plunger and the jaws to facilitate the to and fro movement to the jaws. Additionally, a linkage may be coupled with the plunger to facilitate the to and fro movement to the jaws. The solenoid plunger is powered by a pulse of about 10% to 20% of its duty cycle. The pulse is alternated between a positive and negative pulse to latch and unlatch the solenoid which, in turn, opens and closes the jaws. The permanent magnet is positioned along the axis of the plunger.

According to a third aspect of the disclosure, a gripper includes a housing and a solenoid plunger associated with the housing that defines an axis. The solenoid plunger is a pulsed solenoid plunger. Power is terminated to the solenoid to lock the plunger in a first and second position. A pair of opposing jaws is movable mounted with the housing. The jaws are movable toward and away from one another. The jaws are coupled with the plunger to provide movement to the jaws. The jaws are in an open and closed position when the solenoid is in the first and second positions.

The solenoid is powered by a pulse of from about 0% to 25% of its duty cycle. The pulse is alternated between positive and negative to latch and unlatch the solenoid that, in turn, opens and closes the jaws.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
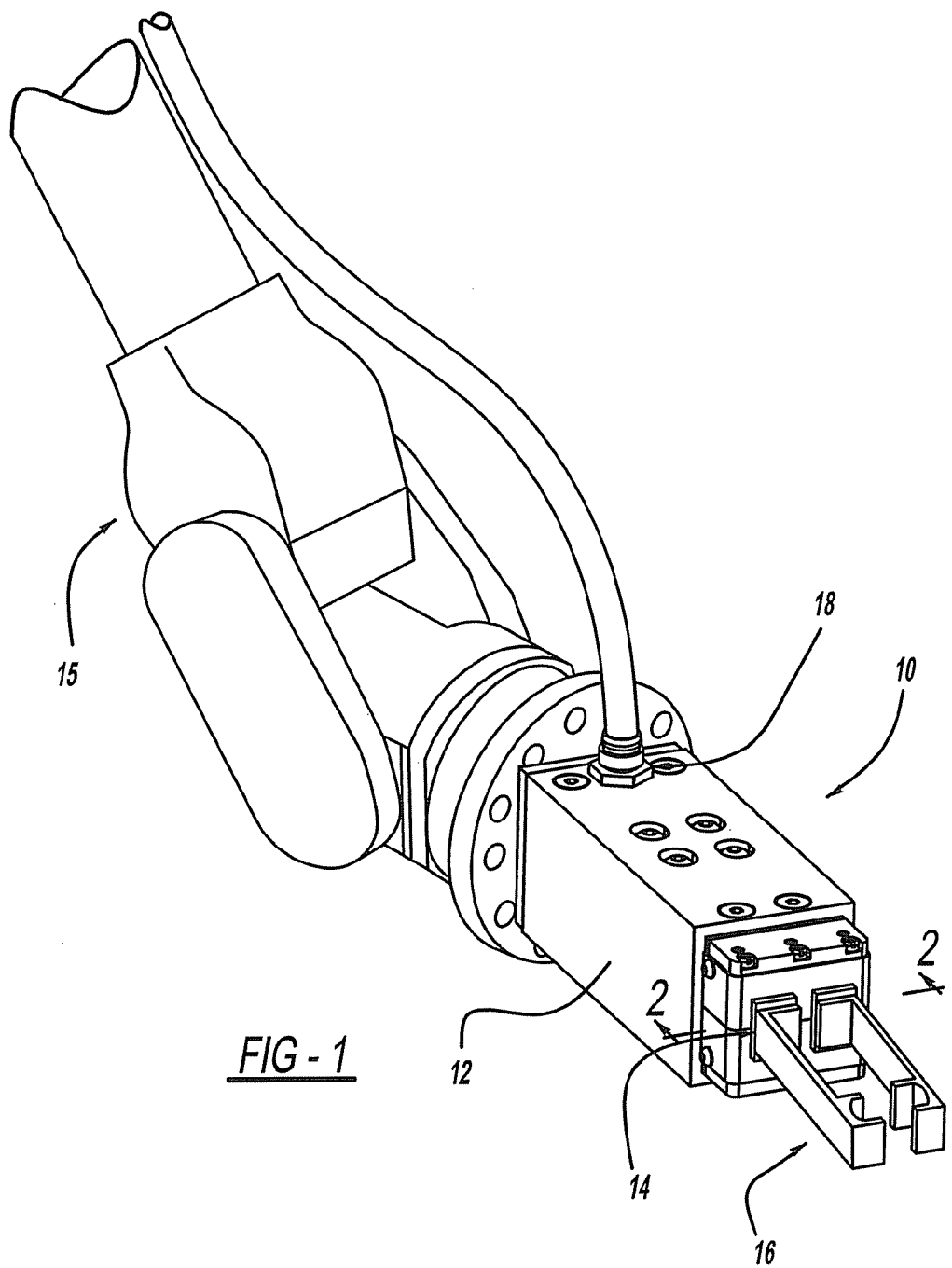
FIG. 1 is a perspective view of a gripper on a robotic arm in accordance with the disclosure.

Turning to the figures, particularly FIG. 1, an electric gripper is illustrated and designated with the reference numeral 10. The gripper 10, mounted to robotic arm 15, includes a housing 12, jaws 14 and gripping fingers 16. Additionally an electrical socket 18 is illustrated that electrically couples with a power source and controller.

A solenoid 20 is secured within the housing 12. The solenoid 20 is of the plunge type. The solenoid includes a winding 22 with an overall cylindrical shape and a bore 26 through its center. A plunger 24 is slidably positioned in the bore 26. The plunger 24 defines an axis of the solenoid 20. A permanent magnet 28 is positioned along the axis of the plunger 24. The permanent magnet 28 is secured by a fastener at the base of the solenoid 20 at the bottom of the stroke of the plunger 24. Thus, the permanent magnet 28 holds and locks the plunger in position at the bottom of its stroke. A bracket 30 is mounted to the coil 22 to couple it with the solenoid 20 and hold it in place, via fasteners, with the housing 12.

The plunger 24 includes a clevis 32 with a pair of arms 34 that receive a pin 48 for holding wedge 36. A helical spring 38 is positioned about the plunger 24 between a clip 40 and a top portion of the bracket 30. Thus, the spring 38 compress and expands as the solenoid is pulsed between a first, latched, and second, unlatched, position.

The wedge 36 has an overall rectangular configuration with a plurality of slots 42, 44, 46. The slot 46 receives a pin 48 that retains the wedge 36 on the plunger clevis 32. The pin 48 is positioned through apertures in the arms 34. The slots 42 and 44 receive pins 52 to secure the wedge 36 with the jaws 14. The slots 42 and 44 are angled with respect to an axis of the rectangular wedge 36 so that as the plunger 24 is moved up and down, the pins 52 in the slots 42 and 44 move the jaws 14 towards and away from one another. The jaws 14 are received in a jaw body 60 that is provided with roller bearings 62 to enable the jaws 14 to easily move in the body 60 towards and away from one an other. Covers 64, 66 maintain the jaws 14 on the body 60. The gripper is shown with a pair of jaws 14; however, it should be understood there could be more than two jaws in the present disclosure.

Figure 2:
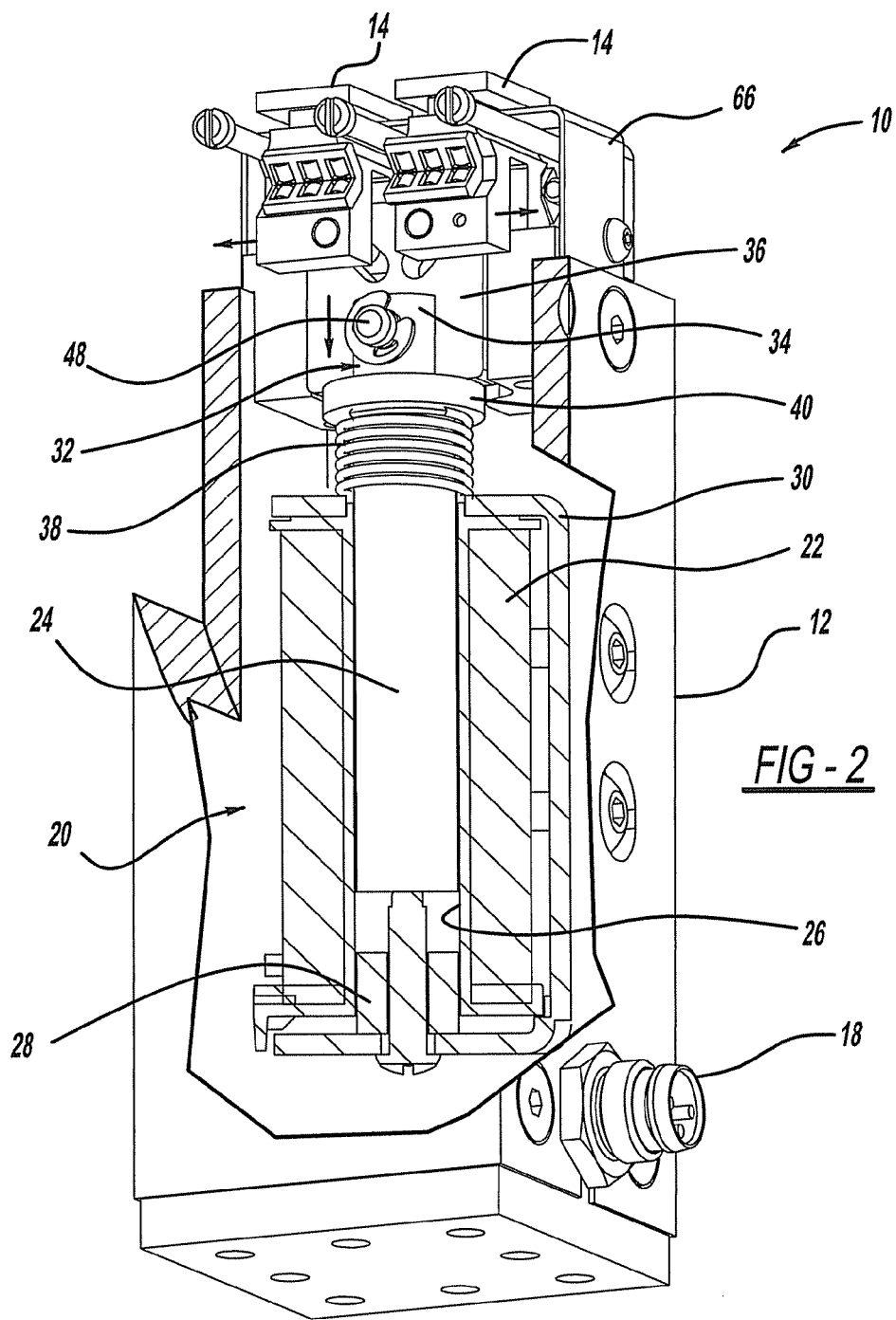
FIG. 2 is a partial cross-section view of FIG. 1 along line 2-2 therein.
Figure 3:
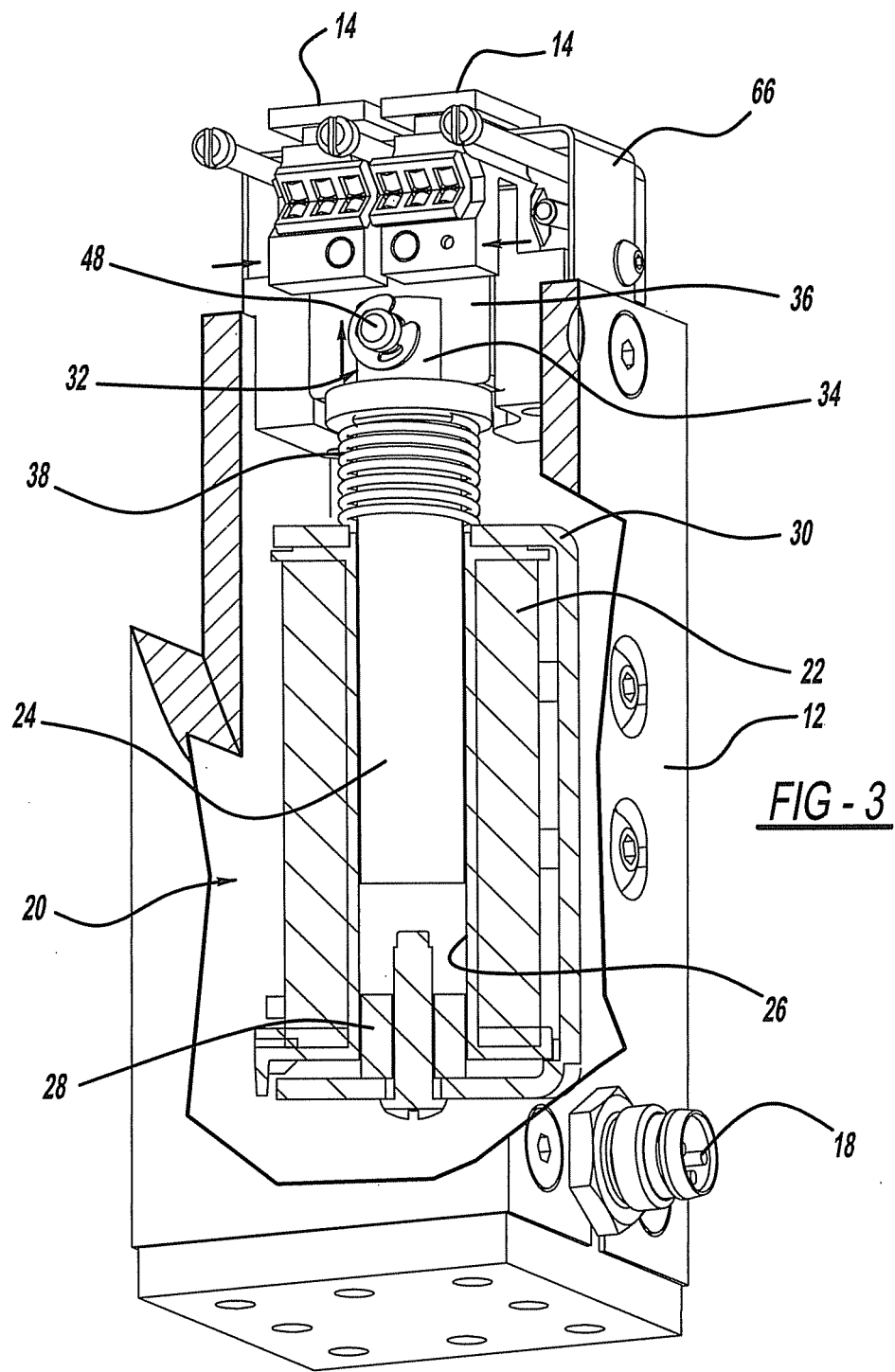
FIG. 3 is a partial cross-section view like FIG. 2 in a second position.
Figure 4:
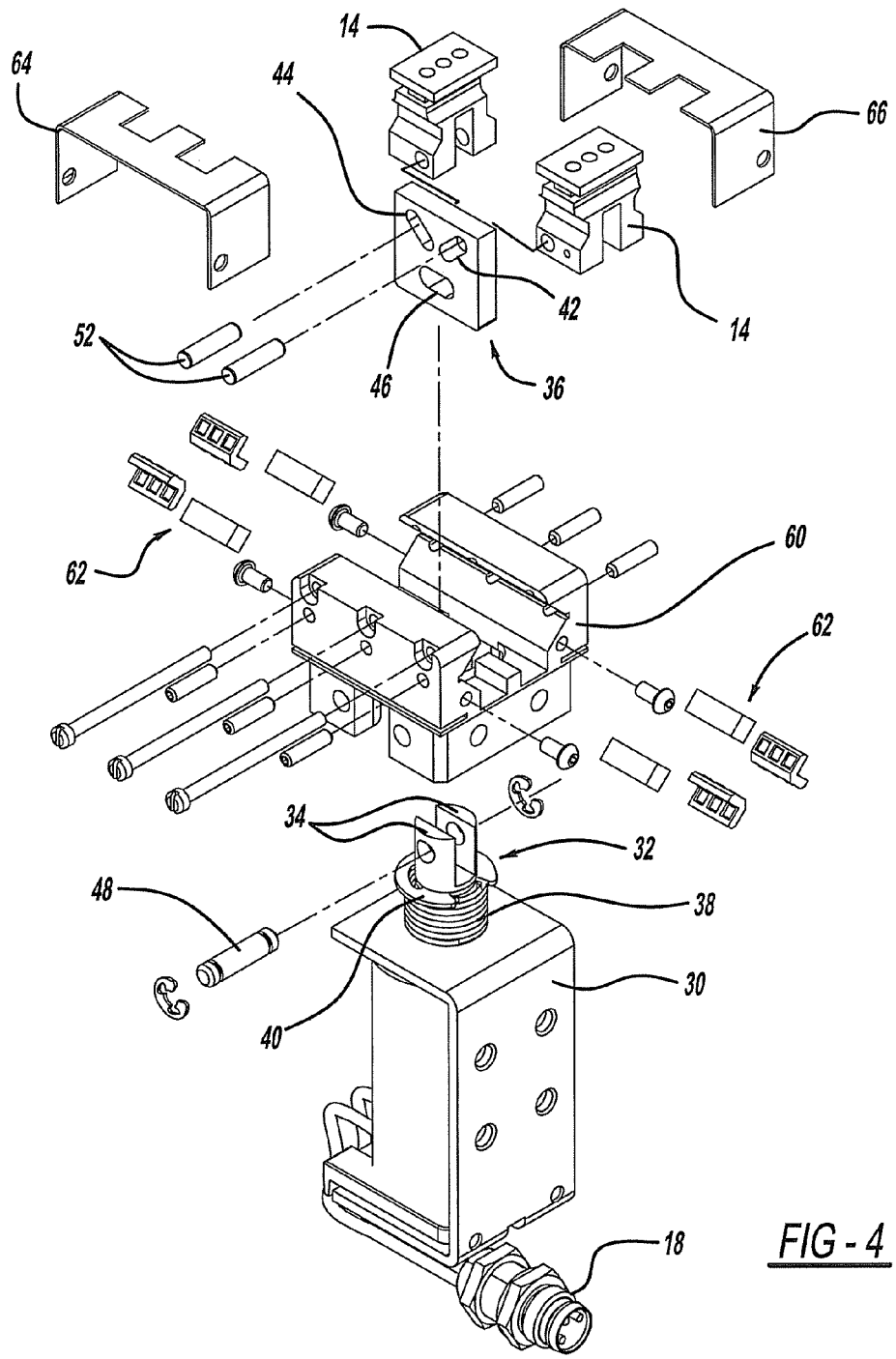
FIG. 4 is a partially exploded view of the gripper of FIG. 1.

An electrical power supply is coupled with the electrical socket 18 of the solenoid 20. The solenoid 20 is a pulse type. Accordingly, a power pulse is provided to the solenoid 20. Ordinarily, the solenoid 20 receives power in a positive or negative pulse fashion. The pulse time is from 0% up to 25% of the duty cycle. Generally, it is about 10%-20% of the duty cycle. The duty cycle is defined as a percentage of time the power is actually on versus the on time plus the off time. Accordingly, the pulse time for a 10% duty cycle solenoid is approximately 50 msec. The dwell time for the 10% duty cycle solenoid is at least 450 msec. between the pulses. The pulsing enables the plunger 24 to move between a first, latched, and second, unlatched, position, as seen in FIGS. 2 and 3. In a first position, the plunger 24 is locked or latched in position by the magnetic attraction between the plunger 24 and the permanent magnet 28. After the solenoid 20 is activated by a pulse, the magnetic force of the coil 22 overcomes that of the permanent magnet 28 releasing the plunger 24 from the permanent magnet 28. As this occurs, the spring 38 expands moving the jaws 14 to a closed position. The pulse is terminated and the spring locks the plunger 24 as well as the jaws 14 in the closed position. Thus, the present disclosure provides a power pulse to the solenoid that, in turn, provides the gripper 10 with an active locked open and locked closed position. When power is terminated to the solenoid 20, the gripper 10 is in its held open or held closed position. Further, since the solenoid 20 is pulsed, excessive heat is not generated by the solenoid 20. Thus, since the solenoid is not always powered as in the prior art, it does not maintain an on condition with constant activation of the solenoid to hold the plunger in an opened or closed position. Thus, the present disclosure overcomes the adverse effects of the prior art electrical gripping apparatus.

Figure 5:
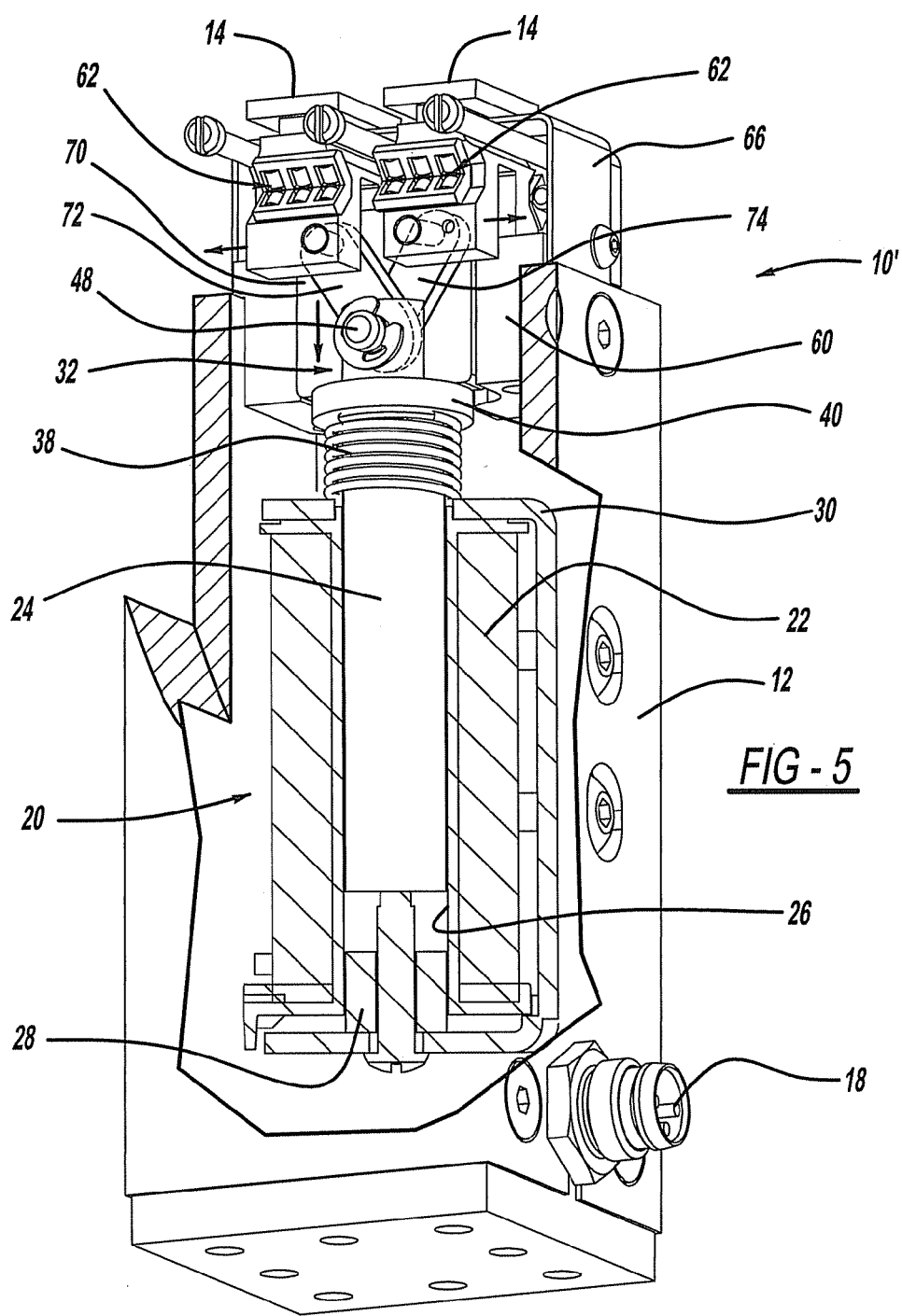
FIG. 5 is a partial cross-section view like FIG. 2 of an additional embodiment of the disclosure.
Figure 6:
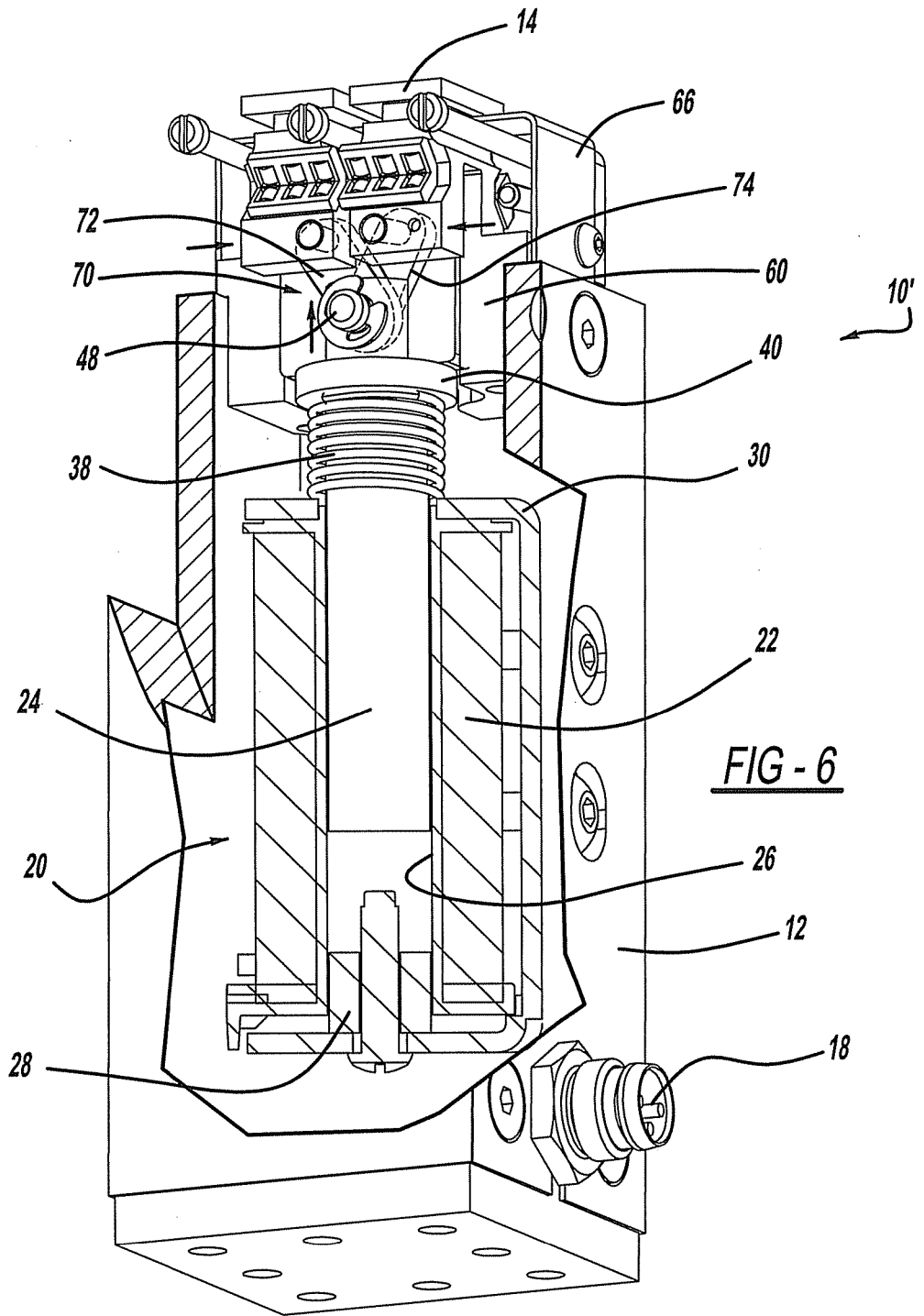
FIG. 6 is a partial cross-section view like FIG. 5 in a second position.

Moving to FIGS. 5 and 6, an additional embodiment is illustrated. In FIGS. 5 and 6, the gripper 10' is substantially the same as that previously discussed. Accordingly, the same reference numerals are utilized to identify like features. The difference between this embodiment and the first embodiment is in the coupling mechanism between the plunger and the jaws.

Here, a linkage 70 including a pair of links 72 and 74 is coupled with the clevis arms 34 of the plunger 24. The other end of the linkage 72 and 74 is coupled with the jaws 14. Accordingly, as the plunger 24 moves axially between its first, latched and second, unlatched positions, the two links 72 and 74 move the jaws 14 in the body 60 towards and away from one another.

Figure 7:
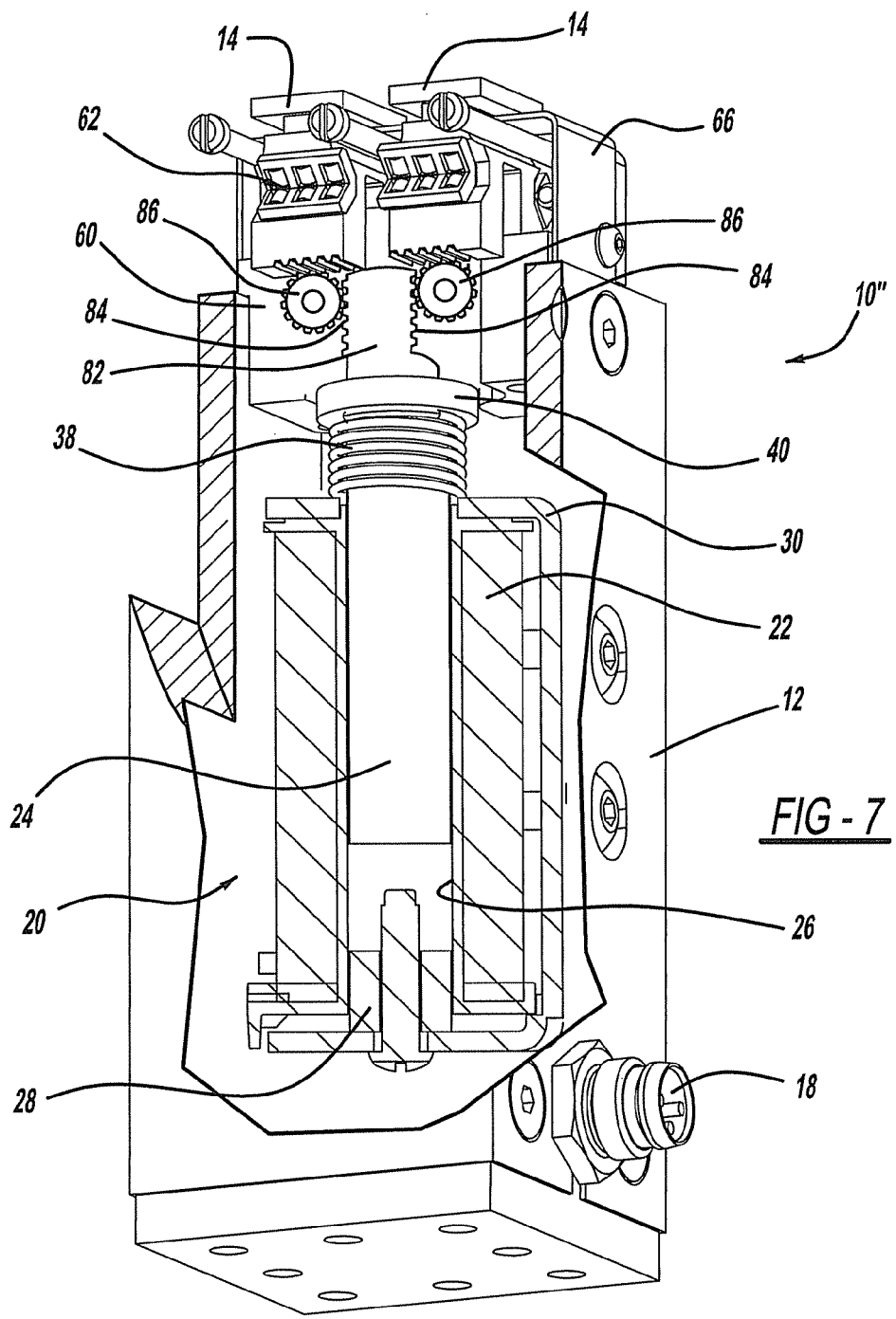
FIG. 7 is a partial cross-section view of an additional embodiment of the gripper.

Turning to FIG. 7, an additional embodiment is illustrated. Here, the embodiment is similar to that previously discussed and thus the same reference numerals are utilized to identify like features. The difference in the present gripper 10" lies in the apparatus for coupling the plunger 24 to the jaws 14.

Here, a double rack and pinion system is utilized. The rack 82 is coupled with the plunger 24. The rack 82 includes a shaft with plurality of teeth 84 on both sides that mesh with pinion gears 86. The pinion gears 86 are coupled with the jaws 14. Thus, as the rack 82 moves axially between its two positions, the pinion gears 82 rotate which, in turn, move the jaws 14 towards and away from one another.

It should be appreciated that while the jaws are illustrated moving in a sliding fashion, an angular gripping jaw may be used and thus provide a pivoting movement to the jaws. Additionally, it is possible to modify the gripper so that the spring locks the jaws in an open position while the permanent magnet locks the jaws in a closed position. This is usually done when the part is gripped on its inside, also known as ID gripping.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A gripper comprising:
 a housing;
 a solenoid including a plunger, the solenoid associated with said housing and defining an axis, during operation, when power is provided to the solenoid, the solenoid is in an activated condition and when power to the solenoid is terminated, the solenoid is in a deactivated condition;

a pair of opposing jaws movably mounted with the housing, said jaws are movable toward and away from each other, said jaws coupled with said plunger for providing movement to said jaws for locking said jaws in an open or closed position;

a first mechanism associated with said plunger for holding and locking said plunger in a first position such that when power is terminated to said solenoid locking of the plunger occurs; and a second mechanism associated with said plunger for holding and locking said plunger in a second position such that when power is terminated to said solenoid locking of the plunger occurs wherein the holding and locking of the plunger by the first and second mechanism, respectively, is dependent upon the operation of the solenoid.

2. The gripper according to claim 1, wherein, said first mechanism is a permanent magnet or a spring.

3. The gripper according to claim 1, wherein said second mechanism is a spring or a permanent magnet.

4. The gripper according to claim 1, further comprising a wedge coupled with the plunger of said solenoid and coupled with said jaws for facilitating movement from said plunger to said jaws.

5. The gripper according to claim 1, further comprising a linkage coupled with the plunger of said solenoid and coupled with said jaws for facilitating movement from said plunger to said jaws.

6. The gripper according to claim 1, further comprising powering said solenoid plunger with a pulse of between 10%-20% of the duty cycle.

7. The gripper according to claim 6, wherein said pulse is alternated between a positive and negative pulse for opening and closing said jaws.

8. The gripper according to claim 1, further comprising a rack with a plurality of teeth coupled with the plunger of said solenoid and a pinion coupled with said jaws and said rack and pinion facilitating movement from said plunger to said jaws.

9. A gripper comprising:

a housing;

a solenoid including a plunger, the solenoid associated with said housing and defining an axis, said solenoid being a pulsed solenoid terminating power to said solenoid for locking and holding said plunger in a first and second position in operation, when power is provided to the solenoid, the solenoid is in an activated condition and when power to the solenoid is terminated, the solenoid is in a deactivated condition;

a pair of opposing jaws movably mounted with the housing, said jaws are movable toward and away from each other, said jaws coupled with said plunger for providing movement to said jaws, wherein said jaws are in an open and closed position when said solenoid is in said first and second positions; and a biasing mechanism directly associated with said plunger for locking and holding said plunger in said first position such that locking occurs when power is terminated to said solenoid, the locking and holding of the plunger by the biasing mechanism is dependent upon the operation of the solenoid.

10. The gripper according to claim 9, further comprising powering said solenoid plunger with a pulse of between about 0% to 25% of the duty cycle.

11. The gripper according to claim 10, wherein said pulse is alternated between a positive and negative pulse for opening and closing said jaws.

* * * * *

UNITED STATES PATENT AND TRADEMARK OFFICE
CERTIFICATE OF CORRECTION

PATENT NO. : 8,628,132 B2
APPLICATION NO. : 13/426711
DATED : January 14, 2014
INVENTOR(S) : James W. Geary et al.

Page 1 of 1

It is certified that error appears in the above-identified patent and that said Letters Patent is hereby corrected as shown below:

Title Page (73) Assignee,
"Delaware Captial Formation, Inc." should be --Delaware Capital Formation, Inc.--

Signed and Sealed this
Tenth Day of June, 2014

Michelle K. Lee
*Deputy Director of the United States Patent and Trademark Office*